United States Patent
Lee

(10) Patent No.: US 11,943,470 B2
(45) Date of Patent: *Mar. 26, 2024

(54) METHOD AND APPARATUS FOR INTER PREDICTION IN VIDEO CODING SYSTEM

(71) Applicant: LG ELECTRONICS INC., Seoul (KR)

(72) Inventor: Jaeho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,791

(22) Filed: Feb. 27, 2023

(65) Prior Publication Data

US 2023/0224490 A1   Jul. 13, 2023

Related U.S. Application Data

(63) Continuation of application No. 17/378,593, filed on Jul. 16, 2021, now Pat. No. 11,622,125, which is a
(Continued)

(51) Int. Cl.
*H04N 19/52* (2014.01)
*H04N 19/105* (2014.01)
(Continued)

(52) U.S. Cl.
CPC ........... *H04N 19/52* (2014.11); *H04N 19/105* (2014.11); *H04N 19/176* (2014.11); *H04N 19/573* (2014.11); *H04N 19/70* (2014.11)

(58) Field of Classification Search
CPC ..... H04N 19/52; H04N 19/105; H04N 19/176
See application file for complete search history.

(56) References Cited

U.S. PATENT DOCUMENTS

| 2008/0240549 A1 | 10/2008 | Koo et al. |
| 2017/0094307 A1 | 3/2017 | Naing et al. |

(Continued)

FOREIGN PATENT DOCUMENTS

| CA | 3148065 A1 | 5/2013 |
| CN | 107113424 A | 8/2017 |

(Continued)

OTHER PUBLICATIONS

CW Hsu et al., "Description of SDR video coding technology proposal by MediaTek", Joint Video Experts Team (JVET) of ITU-T SG 16 WP 3 and ISO/IEC JTC 1/SC 29/WG 11, Apr. 10-20, 2018, JVET-J0018.

(Continued)

*Primary Examiner* — Jeremiah C Hallenbeck-Huber
(74) *Attorney, Agent, or Firm* — Bryan Cave Leighton Paisner LLP

(57) ABSTRACT

The present disclosure relates to a method by which a decoding apparatus performs video coding, comprising the steps of: generating a motion information candidate list for a current block; selecting one candidate from among those included in the motion information candidate list; deriving control point motion vectors (CPMVs) of the current block based on the selected candidate; deriving sub-block-unit or sample-unit motion vectors of the current block based on the CPMVs; deriving a predicted block based on the motion vectors; and reconstructing a current picture based on the predicted block, wherein the motion information candidate list includes an inherited affine candidate, the inherited affine candidate is derived based on candidate blocks coded by affine prediction, from among spatial neighboring blocks of the current block, and the inherited affine candidate is generated up to a pre-defined maximum number.

3 Claims, 13 Drawing Sheets

Related U.S. Application Data continuation of application No. 17/075,494, filed on Oct. 20, 2020, now Pat. No. 11,109,058, which is a continuation of application No. PCT/KR2019/004957, filed on Apr. 24, 2019.

(60) Provisional application No. 62/662,175, filed on Apr. 24, 2018.

(51) Int. Cl.
    *H04N 19/176* (2014.01)
    *H04N 19/573* (2014.01)
    *H04N 19/70* (2014.01)

(56) References Cited

U.S. PATENT DOCUMENTS

| | | | | |
|---|---|---|---|---|
| 2017/0332095 | A1* | 11/2017 | Zou | H04N 19/537 |
| 2018/0098063 | A1* | 4/2018 | Chen | H04N 19/52 |
| 2018/0270500 | A1* | 9/2018 | Li | H04N 19/52 |
| 2019/0028731 | A1* | 1/2019 | Chuang | H04N 19/159 |
| 2019/0058896 | A1* | 2/2019 | Huang | H04N 19/159 |
| 2019/0082191 | A1* | 3/2019 | Chuang | H04N 19/513 |
| 2019/0273943 | A1* | 9/2019 | Zhao | H04N 19/139 |

FOREIGN PATENT DOCUMENTS

| | | |
|---|---|---|
| EP | 2613535 A2 | 7/2013 |
| KR | 20180006961 A | 1/2018 |
| KR | 20180028513 A | 3/2018 |
| WO | 2011025301 A2 | 3/2011 |
| WO | 2017171107 A1 | 10/2017 |
| WO | 2018065296 A1 | 4/2018 |
| WO | 2018067823 A1 | 4/2018 |

OTHER PUBLICATIONS

J. Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, Jul. 13-21, 2017, JVET-G1001-v1.

M. Koo et al., "Description of SDR video coding technology proposal by LG Electronics", Joint Video Experts Team (JVET) of ITU-T SG 16 WP 3 and ISO/IEC JTC 1/SC 29/WG 11, Apr. 10-20, 2018, JVET-J0017-v1.

Huanbang Chen, Fan Liang and Sixin Lin, "Affine Skip and Merge modes for video coding," 2015 IEEE 17th International Workshop on Multimedia Signal Processing (MMSP), Xiamen, 2015, pp. 1-5, (Year: 2015).

* cited by examiner

Translate

Scale

Rotate

Shear

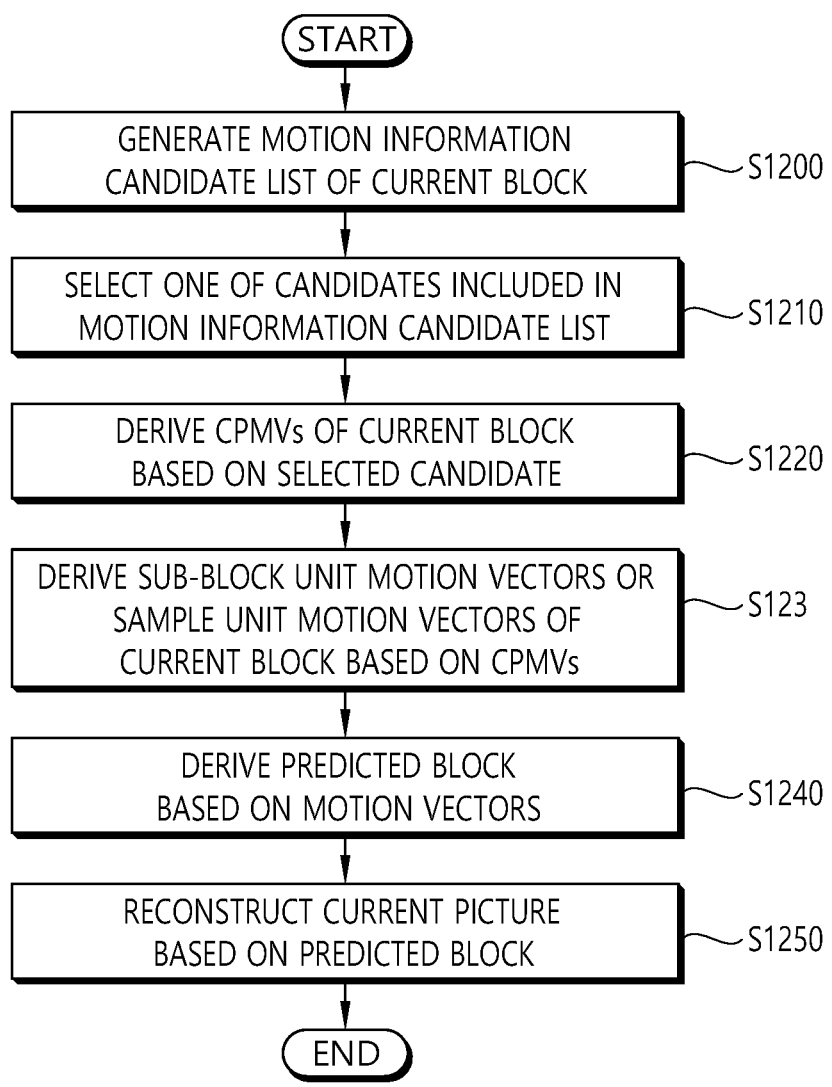

METHOD AND APPARATUS FOR INTER PREDICTION IN VIDEO CODING SYSTEM

CROSS-REFERENCE TO RELATED APPLICATIONS

This application is a continuation of U.S. patent application No. 17/378,593, filed Jul. 16, 2021, which is a continuation of U.S. patent application No. 17/075,494, filed Oct. 20, 2020, which is a continuation of International Application No. PCT/KR2019/004957, filed Apr. 24, 2019, which claims the benefit of U.S. Provisional Application No. 62/662,175, filed Apr. 24, 2018, the contents of which are all hereby incorporated by reference herein in their entirety.

BACKGROUND OF THE DISCLOSURE

Field of the Disclosure

The present disclosure relates to a video coding technology, and more specifically, to an inter-prediction method and apparatus using an inherited affine candidate in a video coding system.

Related Art

Demands for high-resolution and high-quality images, such as High Definition (HD) images and Ultra High Definition (UHD) images, are increasing in various fields. As image data has high resolution and high quality, the amount of information or bits to be transmitted increases relative to legacy image data. Accordingly, when image data is transmitted using a medium, such as a conventional wired/wireless broadband line, or image data is stored using an existing storage medium, a transmission cost and a storage cost thereof are increased.

Accordingly, there is a need for a highly efficient image compression technique for effectively transmitting, storing, and reproducing information of high resolution and high quality images.

SUMMARY

An object of the present disclosure is to provide a method and an apparatus for enhancing video coding efficiency.

Another object of the present disclosure is to provide an inter-prediction method and apparatus in a video coding system.

Still another object of the present disclosure is to provide a method and an apparatus for deriving a motion information candidate list including an inherited affine candidate.

Yet another object of the present disclosure is to provide a method and an apparatus for deriving an inherited affine candidate based on spatial neighboring blocks.

Still yet another object of the present disclosure is to provide a method and an apparatus for grouping spatial neighboring blocks.

Further object of the present disclosure is to provide a method and an apparatus for deriving an inherited affine candidate based on groups.

An exemplary embodiment of the present disclosure provides a video decoding method performed by a decoding apparatus. The decoding method includes: generating a motion information candidate list of a current block, selecting one of candidates included in the motion information candidate list, deriving control point motion vectors (CPMVs) of the current block based on the selected candidate, deriving sub-block unit motion vectors or sample unit motion vectors of the current block based on the CPMVs, deriving a predicted block based on the sub-block unit motion vectors or the sample unit motion vectors, and reconstructing a current picture based on the predicted block, in which the motion information candidate list includes an inherited affine candidate, the inherited affine candidate is derived based on candidate blocks coded by an affine prediction among spatial neighboring blocks of the current block, and the inherited affine candidate is generated up to a predefined maximum number.

Another exemplary embodiment of the present disclosure provides a video encoding method performed by an encoding apparatus. The encoding method includes: generating a motion information candidate list of a current block, selecting one of candidates included in the motion information candidate list, deriving control point motion vectors (CPMVs) of the current block based on the selected candidate, deriving sub-block unit motion vectors or sample unit motion vectors of the current block based on the CPMVs, deriving a predicted block based on the sub-block unit motion vectors or the sample unit motion vectors, generating a residual block for the current block based on the predicted block, and outputting a bitstream by encoding image information including information about the residual block, in which the motion information candidate list includes an inherited affine candidate, the inherited affine candidate is derived based on candidate blocks coded by an affine prediction among spatial neighboring blocks of the current block, and the inherited affine candidate is generated up to a predefined maximum number.

Still another exemplary embodiment of the present disclosure provides a decoding apparatus for performing a video decoding. The decoding apparatus includes: a predictor for generating a motion information candidate list of a current block, selecting one of candidates included in the motion information candidate list, deriving control point motion vectors (CPMVs) of the current block based on the selected candidate, deriving sub-block unit motion vectors or sample unit motion vectors of the current block based on the CPMVs, and deriving a predicted block based on the motion vectors, and a reconstructor for reconstructing a current picture based on the predicted block, in which the motion information candidate list includes an inherited affine candidate, the inherited affine candidate is derived based on candidate blocks coded by an affine prediction among spatial neighboring blocks of the current block, and the inherited affine candidate is generated up to a predefined maximum number.

Yet another exemplary embodiment of the present disclosure provides an encoding apparatus for performing a video encoding. The encoding apparatus includes: a predictor for generating a motion information candidate list of a current block, selecting one of candidates included in the motion information candidate list, deriving control point motion vectors (CPMVs) of the current block based on the selected candidate, deriving sub-block unit motion vectors or sample unit motion vectors of the current block based on the CPMVs, and deriving a predicted block based on the sub-block unit motion vectors or sample unit motion vectors, a subtractor for generating a residual block for the current block based on the predicted block, and an entropy encoder for outputting a bitstream by encoding image information including information about the residual block, in which the motion information candidate list includes an inherited affine candidate, the inherited affine candidate is derived based on candidate blocks coded by an affine prediction among spatial neighboring blocks of the current block, and the inherited affine candidate is generated up to a predefined maximum number.

The present disclosure may perform the inter-prediction through the inherited affine candidate, thereby improving overall coding efficiency.

The present disclosure may configure the motion information candidate list including the inherited affine candidate, thereby improving the performance and efficiency of the inter-prediction.

BRIEF DESCRIPTION OF THE DRAWINGS

FIG. 12 schematically illustrates a video decoding method by a decoding apparatus according to the exemplary embodiment of the present disclosure.

DESCRIPTION OF EXEMPLARY EMBODIMENTS

Figure 1:
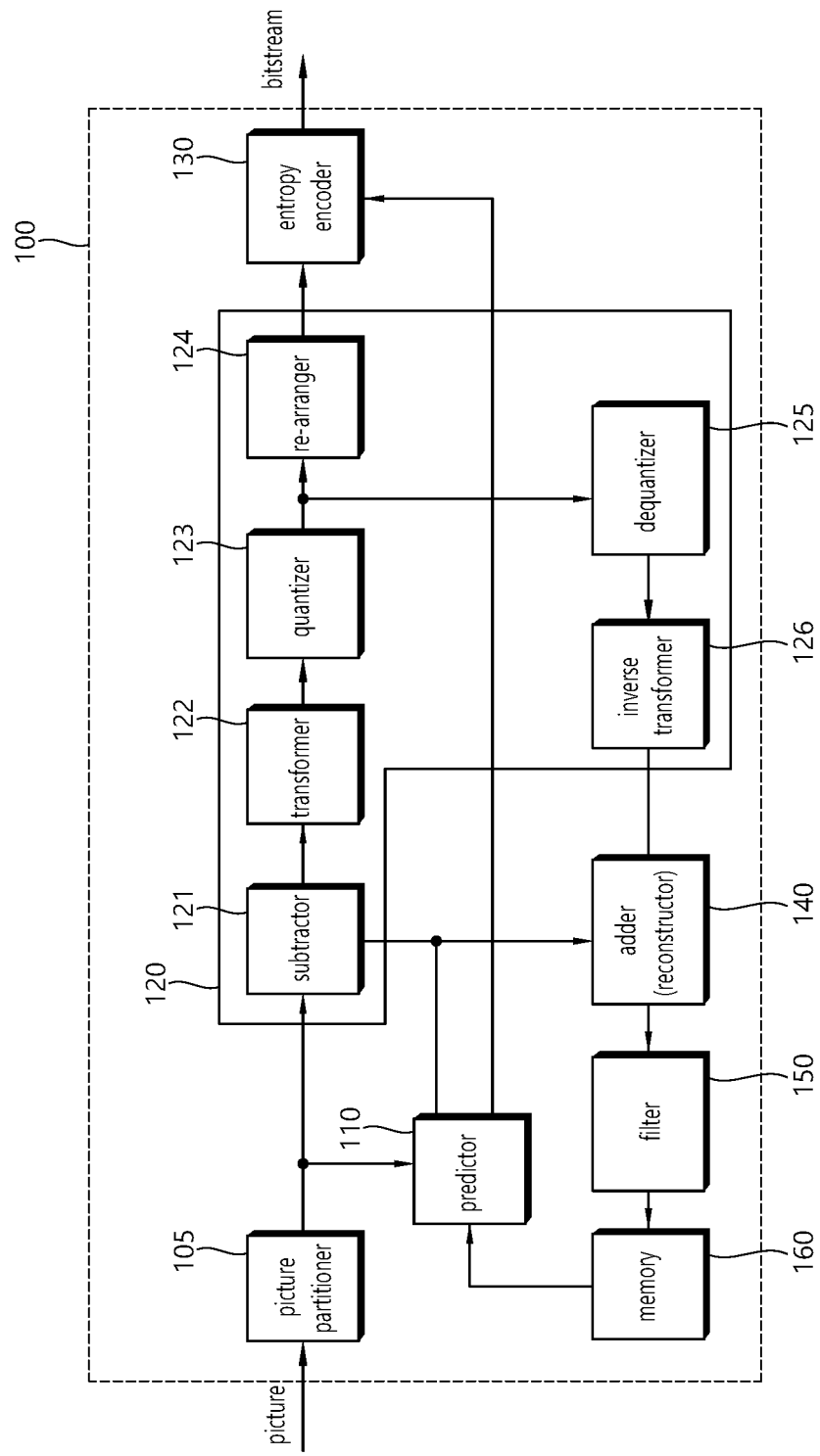
FIG. 1 is a block diagram schematically illustrating a video encoding apparatus according to an exemplary embodiment of the present disclosure.

Since the present disclosure may be variously modified and may have various exemplary embodiments, specific exemplary embodiments will be illustrated in the drawings and described in detail. However, this is not intended to limit the present disclosure to the specific exemplary embodiments. The terms used in the present specification are used to merely describe specific exemplary embodiment, but are not intended to limit the technical spirit of the present disclosure. An expression of a singular number includes an expression of the plural number, unless clearly meant otherwise in the context. In the present specification, the terms such as "include" and "have" are intended to indicate that features, numbers, steps, operations, elements, components, or combinations thereof used in the specification exist, and it should be thus understood that the possibility of existence or addition of one or more different features, numbers, steps, operations, elements, components, or combinations thereof is not excluded in advance.

Meanwhile, respective elements in the drawings described in the present disclosure are independently drawn for the purpose of convenience for explanation of different specific functions in a video encoding apparatus/decoding apparatus, and do not mean that the respective elements are embodied by independent hardware or independent software. For example, two or more of the respective elements may be combined to form a single element, or one element may be divided into plural elements. The exemplary embodiments in which the respective elements are combined and/or divided belong to the present disclosure without departing from the concept of the present disclosure.

In this disclosure, the term "/" and "," should be interpreted to indicate "and/or." For instance, the expression "A/B" may mean "A and/or B," and "A, B" may mean "A and/or B." Further, "A/B/C" may mean "at least one of A, B, and/or C." Also, "A, B, C" may mean "at least one of A, B, and/or C."

Further, in the disclosure, the term "or" should be interpreted to indicate "and/or." For instance, the expression "A or B" may comprise 1) only A, 2) only B, and/or 3) both A and B. In other words, the term "or" in this document may be interpreted to indicate "additionally or alternatively."

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements.

The embodiments in which the elements are combined and/or divided belong to the disclosure without departing from the concept of the disclosure.

The following description may be applied in the technical field which deals with videos, images, or images. For example, a method or an exemplary embodiment disclosed in the following description may be associated with the disclosed contents of a Versatile Video Coding (VVC) standard (ITU-T Rec. H.266), a next-generation video/image coding standard after the VVC, or standards before the VVC (for example, a High Efficiency Video Coding (HEVC) standard (ITU-T Rec. H.265) or the like).

Hereinafter, examples of the present embodiment will be described in detail with reference to the accompanying drawings. In addition, like reference numerals are used to indicate like elements throughout the drawings, and the same descriptions on the like elements will be omitted.

In the present disclosure, a video may mean a set of a series of images according to a passage of time. Generally, a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information about the area. Optionally, the unit may be mixed with terms such as a block, an area, or the like. In a typical case, an M×N block may represent a set of samples or transform coefficients arranged in M columns and N rows.

FIG. 1 is a block diagram briefly illustrating a structure of an encoding apparatus according an embodiment of the present disclosure. Hereinafter, an encoding/decoding apparatus may include a video encoding/decoding apparatus and/or an image encoding/decoding apparatus, and the video encoding/decoding apparatus may be used as a concept comprising the image encoding/decoding apparatus, or the image encoding/decoding apparatus may be used as a concept comprising the video encoding/decoding apparatus.

Referring to FIG. 1, a video encoding apparatus 100 may include a picture partitioner 105, a predictor 110, a residual processor 120, an entropy encoder 130, an adder 140, a filter 150, and a memory 160. The residual processor 120 may include a subtractor 121, a transformer 122, a quantizer 123, a re-arranger 124, a dequantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure, a binary tree structure and/or a ternary tree structure. In this case, for example, the quad tree structure may be first applied and the binary tree structure and ternary tree structure may be applied later. Alternatively, the binary tree structure/ternary tree structure may be applied first. The coding procedure according to the present embodiment may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transform, and reconstruction, which will be described later.

In another example, the processing unit may include a coding unit (CU) prediction unit (PU), or a transformer (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units less than the smallest coding unit. Here, the final coding unit refers to a coding unit which is partitioned or split to a prediction unit or a transformer. The prediction unit is a unit which is partitioned from a coding unit, and may be a unit of sample prediction. Here, the prediction unit may be divided into sub-blocks. The transformer may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transformer may be referred to as a transform block (TB). The prediction block or prediction unit may refer to a specific area in the form of a block in a picture and include an array of prediction samples. Also, the transform block or transformer may refer to a specific area in the form of a block in a picture and include the transform coefficient or an array of residual samples.

The predictor 110 may perform prediction on a processing target block (hereinafter, it may represent a current block or a residual block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (I)), or may derive the prediction sample based on a reference sample existing in a specific (prediction) direction as to a prediction sample among the neighboring reference samples of the current block (case (ii)). The case (a) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bit stream.

When motion information of a temporal neighboring block is used in the skip mode and the merge mode, the highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transform based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding, according to an entropy encoding or according to a pre-configured method, together or separately on information (e.g., a syntax element value or the like) required for video reconstruction in addition to the quantized transform coefficients. The entropy-encoded information may be transmitted or stored in unit of a network abstraction layer (NAL) in a bit stream form. The bitstream may be transmitted via a network or be stored in a digital storage medium. Here, the network may include a broadcasting network or a communications network, the digital storage medium may include various storage medium such as USB, SD, CD, DVD, blue-ray, HDD, SDD and so on.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
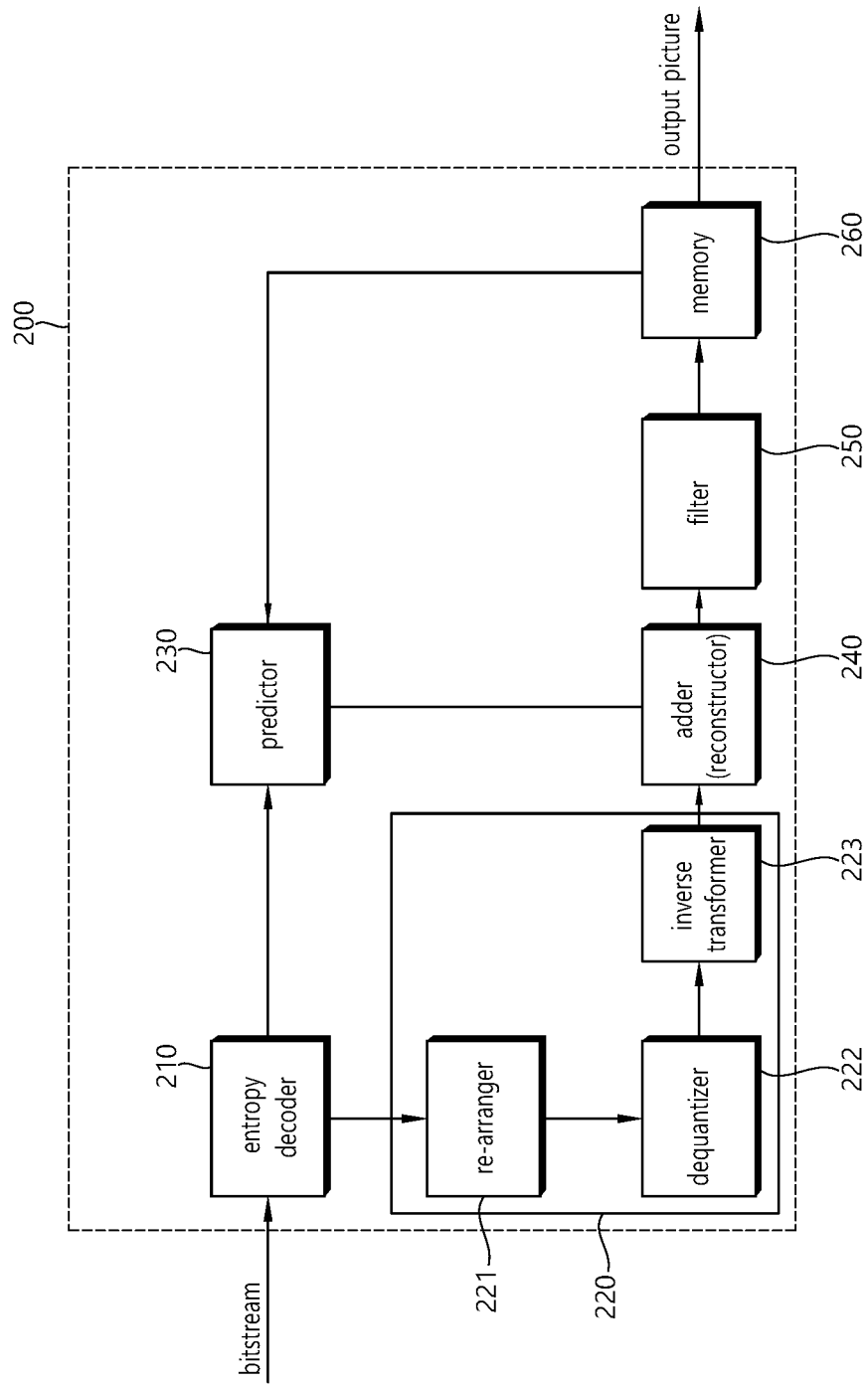
FIG. 2 is a block diagram schematically illustrating a video decoding apparatus according to the exemplary embodiment of the present disclosure.

FIG. 2 is a block diagram briefly illustrating a structure of a video/image decoding apparatus according to an embodiment of the present disclosure.

Hereinafter, a video decoding apparatus may include an image decoding apparatus.

Referring to FIG. 2, a video decoding apparatus 200 may include an entropy decoder 210, a residual processor 220, a predictor 230, an adder 240, a filter 250, and a memory 260. The residual processor 220 may include a re-arranger 221, a dequantizer 222, an inverse transformer 223.

Further, although it is not depicted, the video decoding apparatus 200 may include a receiver for receiving a bit-stream including video information. The receiver may be configured as a separate module or may be included in the entropy decoder 210.

When a bit stream including video/image information is input, the video decoding apparatus 200 may reconstruct a video/image/picture in association with a process by which video information is processed in the video encoding apparatus.

For example, the video decoding apparatus 200 may perform video decoding using a processing unit applied in the video encoding apparatus. Thus, the processing unit block of video decoding may be, for example, a coding unit and, in another example, a coding unit, a prediction unit or a transformer. The coding unit may be split from the largest coding unit according to the quad tree structure and/or the binary tree structure and/or ternary tree structure.

A prediction unit and a transformer may be further used in some cases, and in this case, the prediction block is a block derived or partitioned from the coding unit and may be a unit of sample prediction. Here, the prediction unit may be divided into sub-blocks. The transformer may be split from the coding unit according to the quad tree structure and may be a unit that derives a transform coefficient or a unit that derives a residual signal from the transform coefficient.

The entropy decoder 210 may parse the bit stream to output information required for video reconstruction or picture reconstruction. For example, the entropy decoder 210 may decode information in the bit stream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bit stream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding apparatus. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding apparatus.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding apparatus, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. In the skip mode and the merge mode, a firstly-ordered picture in the reference picture list may be used as a reference picture when motion information of a temporal neighboring block is used.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bit stream. That is, the MVD may be obtained by subtracting the motion vector predictor from the motion vector of the current block. Here, the predictor 230 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, position information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter-prediction of a picture afterward, the encoding apparatus may also dequantize/inverse-transform the quantized transform coefficients to derive a residual block and generate a reconstructed picture based thereon.

Figure 3:
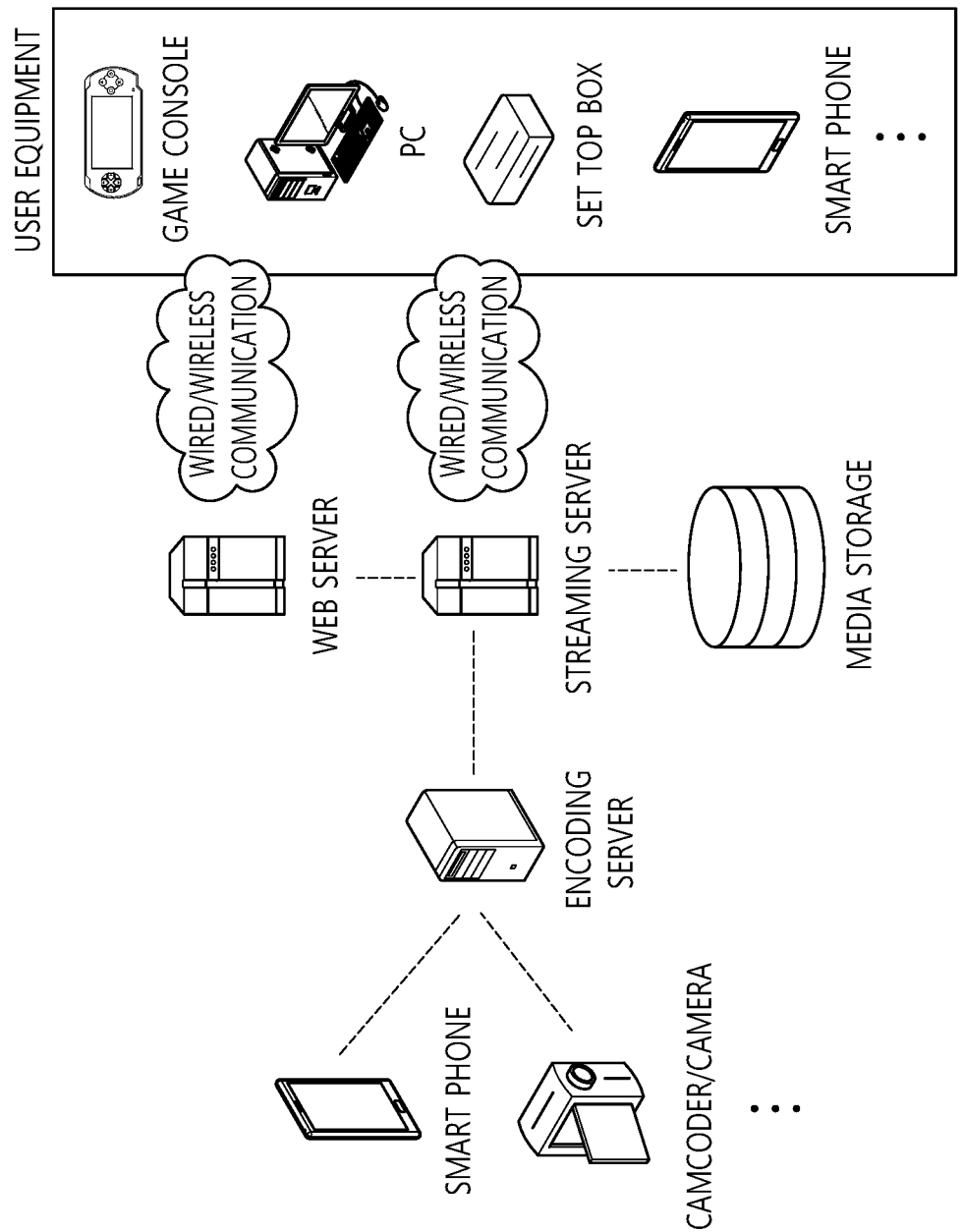
FIG. 3 exemplarily illustrates a content streaming system according to the exemplary embodiment of the present disclosure.

FIG. 3 exemplarily illustrates a content streaming system according to the exemplary embodiment of the present disclosure.

Referring to FIG. 3, exemplary embodiments illustrated in the present disclosure may be implemented and performed by a processor, a microprocessor, a controller, or a chip. For example, functional units illustrated in each drawing may be implemented and performed by a computer, the processor, the microprocessor, the controller, or the chip. In this case, information for implementation (e.g., information on instructions) or algorithm may be stored in a digital storage medium.

Further, a decoding apparatus and an encoding apparatus to which the present disclosure is applied may be included in a multimedia broadcasting transceiver apparatus, a mobile communication terminal, a home cinema video apparatus, a digital cinema video apparatus, a surveillance camera, a video chat apparatus, a real-time communication apparatus such as a video communication, a mobile streaming apparatus, a storage medium, a camcorder, a video-on-demand (VoD) service provision apparatus, an over the top (OTT) video apparatus, an Internet streaming service provision apparatus, a three-dimensional (3D) video apparatus, an image phone video apparatus, a medical video apparatus, or the like, and used to process a video signal or a data signal. For example, the OTT video apparatus may include a game console, a Blu-ray player, an Internet access TV, a home theater system, a smartphone, a tablet PC, a digital video recorder (DVR), or the like.

Further, a processing method to which the present disclosure is applied may be produced in a form of a program executed by a computer, and stored in a computer readable recoding medium. Multimedia data having a data structure according to the present disclosure may also be stored in the computer readable recoding medium. The computer readable recording medium includes all types of storage apparatuses and distribution storage devices in which computer readable data are stored. The computer readable recording medium may include, for example, a Blu-ray disc (BO), a universal serial bus (USB), a ROM, a PROM, an EPROM, an EEPROM, a RAM, a CD-ROM, a magnetic tape, a floppy disc, and an optical data storage apparatus. Further, the computer readable recording medium includes a media implemented in a form of a carrier (e.g., transmission through Internet). Further, a bitstream generated by an encoding method may be stored in the computer readable recording medium or transmitted through wired/wireless communication networks.

Further, the exemplary embodiment of the present disclosure may be implemented by a computer program product by a program code, and the program code may be performed by the computer according to the exemplary embodiment of the present disclosure. The program code may be stored on a computer readable carrier.

A content streaming system to which the present disclosure is applied may largely include an encoding server, a streaming server, a web server, a media storage, a user apparatus, and a multimedia input apparatus.

The encoding server serves to generate a bitstream by compressing the content input from the multimedia input apparatuses such as a smartphone, a camera, and a camcorder into digital data and transmit the bitstream to the streaming server. As another example, if the multimedia input apparatuses such as the smartphone, the camera, and the camcorder directly generate the bitstream, the encoding server may be omitted.

The bitstream may be generated by the encoding method or the bitstream generation method to which the present disclosure is applied, and the streaming server may temporarily store the bitstream in a process of transmitting or receiving the bitstream.

The streaming server acts as a medium which transmits the multimedia data to the user apparatus based on a user demand through the web server, and the web server serves as a medium of informing the user of whether which service exists. When the user requests the desired service to the web server, the web server transfers the desired service to the streaming server, and the streaming server transmits the multimedia data to the user. At this time, the content streaming system may include a separate control server, and in this case, the control server serves to control instructions/responses between the respective apparatuses within the content streaming system.

The streaming server may receive the content from the media storage and/or the encoding server. For example, when receiving the content from the encoding server, the streaming server may receive the content in real time. In this case, to provide the smooth streaming service, the streaming server may store the bitstream during a predefined time.

As an example of the user apparatus, there may be a mobile phone, a smartphone, a laptop computer, a digital broadcasting terminal, a personal digital assistance (PDA), a portable multimedia player (PMP), a navigation terminal, a slate PC, a tablet PC, an ultra-book, a wearable device (e.g., watch-type terminal (smartwatch), a glass-type terminal (smart glass), or a head mounted display (HMD)), a digital TV, a desktop computer, a digital signage, and the like.

The respective servers within the content streaming system may be operated as the distribution server, and in this case, the data received by each server may be distributed and processed.

Hereinafter, the inter-prediction method described with reference to FIGS. 1 and 2 will be described in detail.

Various inter-prediction modes may be used to predict a current block within a picture. For example, various modes such as a merge mode, a skip mode, a motion vector prediction (MVP) mode, an affine mode, and a historical motion vector prediction (HMVP) mode may be used. A decoder side motion vector refinement (DMVR) mode, an adaptive motion vector resolution (AMVR) mode, and the like may be further used as additional modes. The affine mode may also be referred to as an affine motion prediction mode. The MVP mode may also be referred to as an advanced motion vector prediction (AMVP). In the present document, some modes and/or a motion information candidate derived by some modes may also be included as one of motion information-related candidates in other modes.

Prediction mode information indicating the inter-prediction mode of the current block may be signaled from the encoding apparatus to the decoding apparatus. The prediction mode information may be included in the bitstream and received by the decoding apparatus. The prediction mode information may include index information indicating one of a plurality of candidate modes. Alternatively, the prediction mode information may also indicate the inter-prediction mode through the hierarchical signaling of flag information. In this case, the prediction mode information may include one or more flags. For example, the prediction mode information may indicate whether the skip mode is applied by signaling a skip flag, indicate whether the merge mode is applied by signaling a merge flag in the skip mode is not applied, indicate that the MVP mode is applied or further signal the flag for additional identification if the merge mode is not applied. The affine mode may also be signaled to an independent mode, or may also be signaled to a mode dependent on the merge mode, the MVP mode, or the like. For example, the affine mode may include an affine merge mode and an affine MVP mode.

The inter-prediction may be performed using the motion information of the current block. The encoding apparatus may derive optimal motion information for the current block through a motion estimation procedure. For example, the encoding apparatus may search for a similar reference block having high correlation within a predefined searching range within a reference picture in units of fractional pixel using an original block within an original picture for the current block, thereby deriving motion information. The similarity of the block may be derived based on a difference between phase-based sample values. For example, the similarity of the block may be calculated based on a sum of absolute difference (SAD) between the current block (or a template of the current block) and the reference block (or a template of the reference block). In this case, the motion information may be derived based on the reference block having the smallest SAD within the searching region. The derived motion information may be signaled to the decoding apparatus according to various methods based on the inter-prediction mode.

Figure 4:
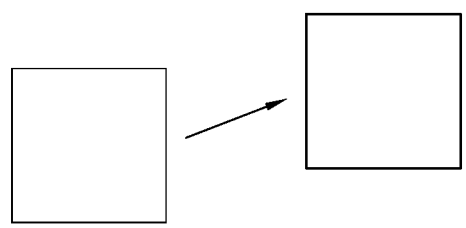
FIG. 4 exemplarily illustrates an affine motion model according to the exemplary embodiment of the present disclosure.
Figure 4:
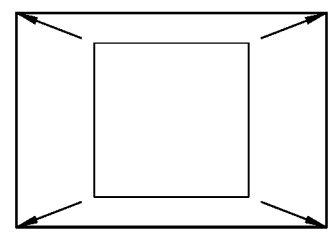
Figure 4:
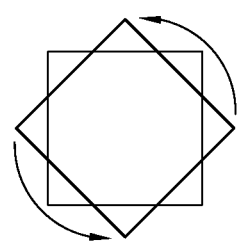
Figure 4:
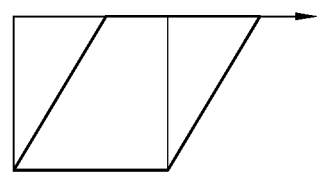

FIG. 4 exemplarily illustrates an affine motion model according to the exemplary embodiment of the present disclosure.

A general video coding system uses one motion vector to express the motion of a coding block. However, such a method may represent an optimal motion in a block unit, but the optimal motion of each pixel may not be actually represented. Therefore, to further improve coding efficiency, the affine mode or the affine motion prediction mode, which performs a coding using the affine motion model capable of determining the optimal motion vector in a pixel unit, may be used. Here, the affine mode may also determine the optimal motion vector in a sub-block unit of the current block in order to further improve the coding efficiency. The affine motion prediction mode may represent the motion vector in each pixel unit of the block using two, three, or four motion vectors.

Referring to FIG. 4, the affine motion model may include four motion models, but this is an exemplary motion model, such that the scope of the present disclosure is not limited thereto. The aforementioned four motions may include translate, scale, rotate, and shear.

Figure 5A:
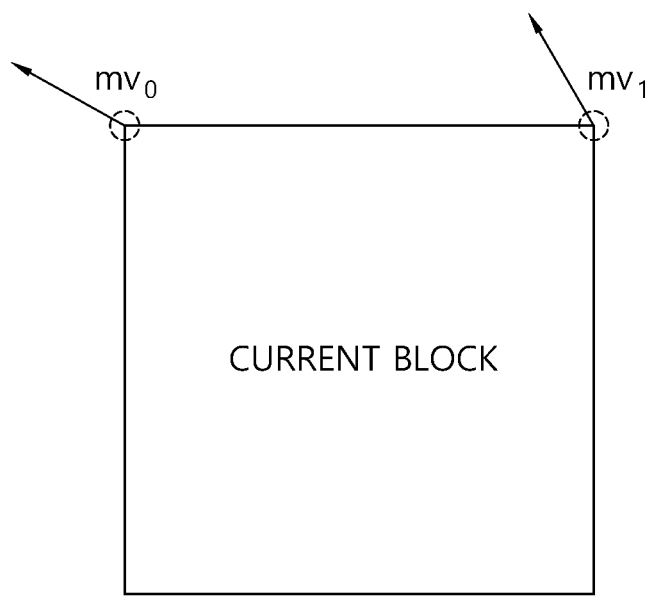
FIGS. 5A and 5B exemplarily illustrate a 4-parameter affine model and a 6-parameter affine model according to the exemplary embodiment of the present disclosure.
Figure 5B:
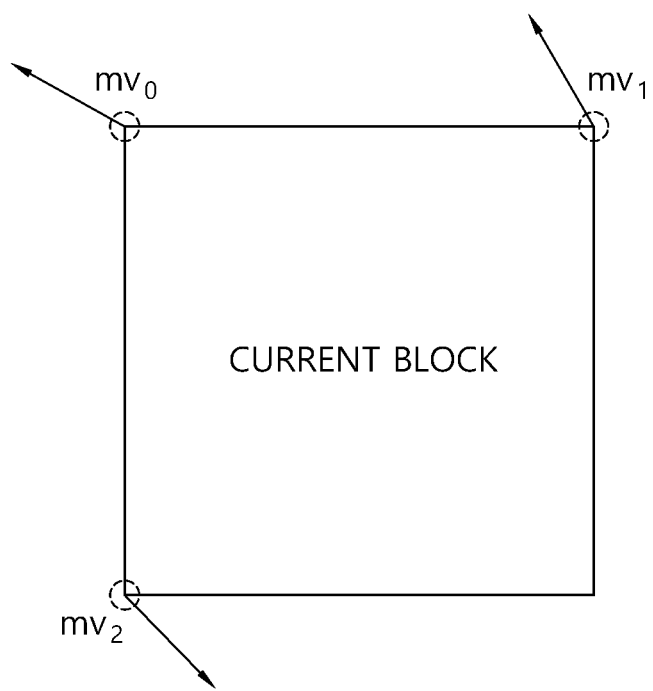

FIGS. 5A and 5B exemplarily illustrate a 4-parameter affine model and a 6-parameter affine model according to the exemplary embodiment of the present disclosure.

Referring to FIGS. 5A and 5B, the affine motion prediction may define a control point (CP) in order to use the affine motion model, and the motion vector of the pixel position or the sub-block included in the block using two or more control point motion vectors (CPMVs). Here, a group of the motion vectors of the pixel position or the sub-block included in the block may be referred to as an affine motion vector field (affine MVF).

Referring to FIG. 5A, the 4-parameter affine model may mean a model of determining the motion vector of the pixel position or the sub-block using two CPMVs, and the motion vectors of the pixel position or the sub-block or the affine motion vector field may be derived as expressed in Equation 1.

$$\begin{cases} mv_x = \dfrac{mv_{1x} - mv_{0x}}{W} x + \dfrac{mv_{1y} - mv_{0y}}{W} y + mv_{0x} \\ mv_y = \dfrac{mv_{1y} - mv_{0y}}{W} x + \dfrac{mv_{1y} - mv_{0x}}{W} y + mv_{0y} \end{cases} \qquad \text{Equation 1}$$

Referring to FIG. 5B, the 6-parameter affine model may mean a model of determining the motion vector of the pixel position or the sub-block using three CPMV motion vectors, and the motion vectors of the pixel position or the sub-block or the affine motion vector field may be derived as expressed in Equation 2.

$$\begin{cases} mv_x = \dfrac{mv_{1x} - mv_{0x}}{W} x + \dfrac{mv_{2x} - mv_{0x}}{H} y + mv_{0x} \\ mv_y = \dfrac{mv_{1y} - mv_{0y}}{W} x + \dfrac{mv_{2y} - mv_{0y}}{H} y + mv_{0y} \end{cases} \qquad \text{Equation 2}$$

In Equations 1 and 2, the $mv_{0x}$ and the $mv_{0y}$ may refer to the CPMVs of the CPs at the top-left corner position of the current block, the $mv_{1x}$ and the $mv_{1y}$ may refer to the CPMVs of the CPs of the top-right corner position of the current block, and the $mv_{2x}$ and the $mv_{2y}$ may refer to the CPMVs of the CPs of the bottom-left corner position of the current block. Further, the W may refer to the width of the current block, and the H may refer to the height of the current block. The $mv_x$ and the $mv_y$ may refer to the motion vector of the pixel of a (x, y) position or the sub-block including the (x, y) position.

That is, the exemplary embodiment of the present disclosure may propose an affine motion prediction method.

Mostly in the video coding, a motion estimation (ME) and a motion compensation (MC) are performed based on a translation motion model efficient for representing a simple motion. However, this model may not be efficient for representing complicated motions within a nature video such as zooming, rotation, and other irregular motions. Therefore, the affine motion prediction may be proposed based on the affine motion model in order to overcome the limitation of the translation motion model.

The affine motion vector field (MVF) may be expressed by two motion vectors, if the 4-parameter affine motion model is used. Referring to FIG. 5A, the top-left corner point and the top-right corner point may be expressed as a 0th control point ($CP_0$) and a first control point ($CP_1$), and corresponding two motion vectors may be expressed as a 0th control point motion vector ($CPMV_0$) and a first control point motion vector ($CPMV_1$). In FIG. 5A, the $mv_0$ may refer to the $CPMV_0$, and the mvi may refer to the $CPMV_1$.

Figure 6:
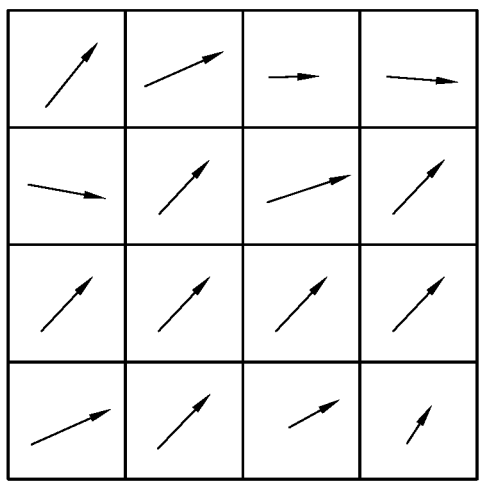
FIG. 6 exemplarily illustrates a case where an affine motion vector field according to the exemplary embodiment of the present disclosure is determined in a sub-block unit.

FIG. 6 exemplarily illustrates a case where the affine motion vector field according to the exemplary embodiment of the present disclosure is determined in a sub-block unit.

In the affine motion compensation, the affine MVF may be determined in a sub-block level in order to reduce the affine motion compensation complexity. If the 4-parameter affine motion model is used, the motion vector of a center position of each sub-block may be calculated as expressed in Equation 1. For example, FIG. 6 may be an example in which the affine MVF is determined in the 4×4 sub-block level, but the affine MVF may also be determined in the sub-block level having different sizes, and may also be determined in a sample unit, such that the scope of the present disclosure is not limited thereto.

Figure 7:
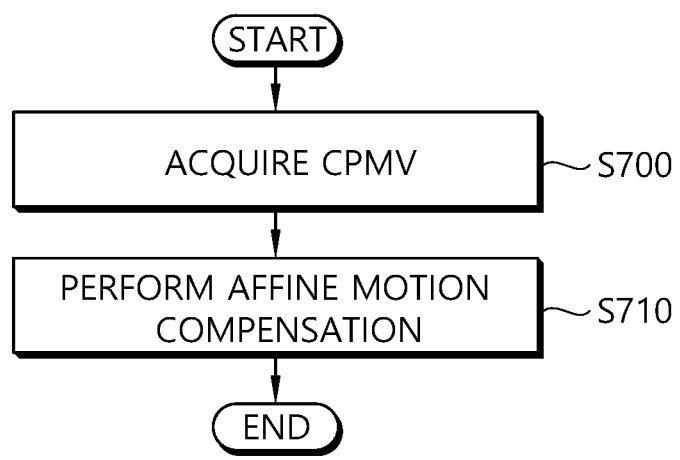
FIG. 7 exemplarily illustrates a flowchart of an affine motion prediction method according to the exemplary embodiment of the present disclosure.

FIG. 7 exemplarily illustrates a flowchart of the affine motion prediction method according to the exemplary embodiment of the present disclosure.

Referring to FIG. 7, the affine motion prediction method may be largely represented as follows. When the affine motion prediction method starts, a CPMV pair may be first acquired (S700). Here, the CPMV pair may include the $CPMV_0$ and the $CPMV_1$ if the 4-parameter affine model is used.

Thereafter, the affine motion compensation may be performed based on the CPMV pair (S710), and the affine motion prediction may be terminated.

To determine the $CPMV_0$ and the CPMV 1, two affine prediction modes may exist. Here, two affine prediction modes may include an affine inter mode and an affine merge mode. The affine inter mode may clearly determine the $CPMV_0$ and the $CPMV_1$ by signaling motion vector difference (MVD) information for two $CPMV_0$ and the $CPMV_1$. On the other hand, the affine merge mode may derive the CPMV pair without signaling the MVD information.

That is, the affine merge mode may derive the CPMV of the current block using the CPMV of a neighboring block coded in the affine mode, and if the motion vector is determined in the sub-block unit, the affine merge mode may also be referred to as a sub-block merge mode.

In the affine merge mode, the encoding apparatus may signal an index for the neighboring block coded in the affine mode for deriving the CPMV of the current block to the decoding apparatus, and further signal the difference value between the CPMV of the neighboring block and the CPMV of the current block as well. Here, the affine merge mode may configure an affine merge candidate list based on the neighboring block, and the index for the neighboring block may represent the neighboring block to be referred to in order to derive the CPMV of the current block in the affine merge candidate list. The affine merge candidate list may also be referred to as a sub-block merge candidate list.

The affine inter mode may also be referred to as an affine MVP mode. The affine MVP mode may derive the CPMV of the current block based on a control point motion vector predictor (CPMVP) and a control point motion vector difference (CPMVD). That is, the encoding apparatus may determine the CPMVP with respect to the CPMV of the current block, and derive the CPMVD which is the difference value between the CPMV and the CPMVP of the current block to signal information about the CPMVP and information about the CPMVD to the decoding apparatus. Here, the affine MVP mode may configure the affine MVP candidate list based on the neighboring block, and the information about the CPMVP may represent the neighboring block to be referred to in order to derive the CPMVP for the CPMV of the current block in the affine MVP candidate list. The affine MVP candidate list may also be referred to as a control point motion vector predictor candidate list.

Figure 8:
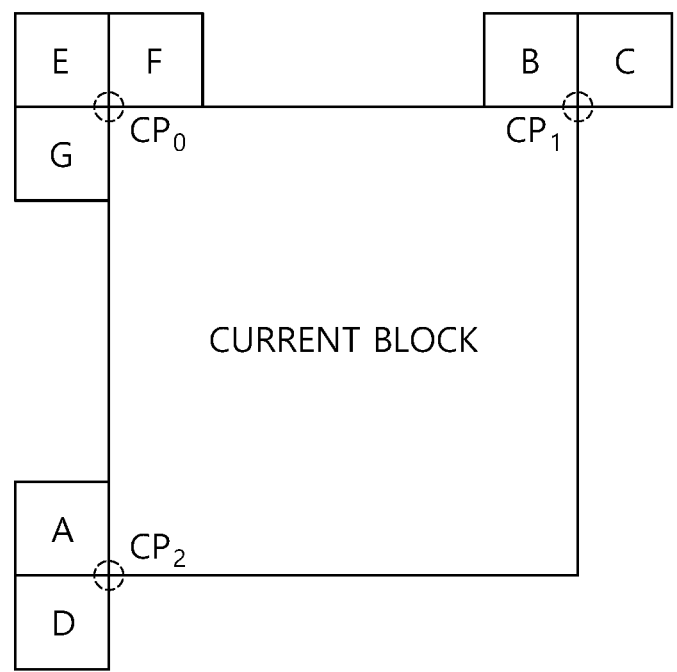
FIG. 8 exemplarily illustrates a position of a neighboring block for examining a neighboring affine block according to the exemplary embodiment of the present disclosure.

FIG. 8 exemplarily illustrates the location of the neighboring block for examining a neighboring affine block according to the exemplary embodiment of the present disclosure.

The exemplary embodiment of the present disclosure may provide an inherited affine candidate for the affine merge mode. That is, the inherited affine candidate may be considered as the candidate of the affine merge mode.

Here, a method for using the inherited affine candidate may be a method for inducing the motion information (motion vector and reference picture index) of the current block using the affine motion model of the neighboring affine block if the neighboring block is the block coded by the affine prediction (hereinafter, referred to as a neighboring affine block), and encoding/decoding the coded block using the induced motion information. Therefore, the inherited affine candidate may be effective only if the neighboring affine block exists, and predefined maximum n inherited affine merge candidates may be generated. Here, the n may be 0 or a natural number.

Assuming that the n is 1, if the number of neighboring affine blocks is 1, one affine merge candidate may be generated. If the number of neighboring affine blocks is two or more, the neighboring affine block may be selected to generate the affine merge candidate, and as the selection method, any one of the following methods may be used.

1) A neighboring affine block first confirmed by examining the neighboring block according to a predefined order may be used for the affine merge mode. The neighboring block may include blocks A, B, C, D, E, F, G illustrated in FIG. 8 or some blocks among them. Here, the examination order may be variously considered. 2) A neighboring affine block having the smallest reference index among the neighboring affine blocks or having a reference frame closest to the current block may be used for the affine merge mode. 3) A block determined by a predefined priority among the blocks having the neighboring affine block having the most frequently occurring reference index may be used. Here, the most frequently occurring reference index may mean the most common reference index based on the number of reference indexes of all neighboring blocks or reference indexes of the neighboring affine blocks. 4) A block having the largest block size among the neighboring affine blocks may be used. Here, if two or more blocks having the largest block size exist, the blocks may be determined according to a predefined order.

The aforementioned methods have been described assuming that the n is 1, but the case where the n is two or more may also be extensively considered. As an example, assuming that the n is 2, each method may perform a pruning check, and be as follows. Further, in each method, the case where the n exceeds 2 may also be extensively considered.

1) Two neighboring affine blocks first confirmed by examining the neighboring block according to a predefined order may be used for the affine merge mode. The neighboring block may include blocks A, B, C, D, E, F, G illustrated in FIG. 8 or some blocks among them. 2) A neighboring affine block having the smallest reference index among the neighboring affine blocks or having a reference frame closest to the current block may be used for the affine merge mode. If the number of neighboring affine blocks having the smallest reference index is three or more, two neighboring affine blocks determined by a predefined priority may be used for the affine merger mode. 3) Two blocks determined by a predefined priority among the blocks having the neighboring affine block having the most frequently occurring reference index may be used. Here, the most frequently occurring reference index may mean the most frequently occurring reference index based on the number of reference indexes of all neighboring blocks or reference indexes of the neighboring affine blocks. 4) A block having the largest block size among the neighboring affine blocks may be used. Here, if three or more blocks having the largest block size exist, the blocks may be determined according to a predefined order.

The exemplary embodiment of the present disclosure may provide the inherited affine candidate for the affine inter mode. That is, the inherited affine candidate may be considered as the candidate of the affine inter mode.

Here, a method for using the inherited affine candidate may be a method for inducing the motion vector of the current block using the affine motion model, and encoding/decoding the coded block using the induced motion vector. Therefore, the inherited affine candidate may be effective only if the neighboring affine block exists, and predefined maximum n inherited affine candidates may be generated. Here, the n may be 0 or a natural number.

Assuming that the n is 1, if the number of neighboring affine blocks is 1, one inherited affine candidate may be generated. Here, if the reference picture of the current block and the reference picture of the neighboring affine block are different, the affine merge candidate may be scaled and used based on the reference picture of the current block. This may be referred to as a scaled affine candidate. If the number of neighboring affine blocks is two or more, the neighboring affine block may be selected to generate the affine merge candidate, and as the selection method, any one of the following method may be used.

1) A neighboring affine block first confirmed by examining the neighboring block according to a predefined order may be used for the affine merge mode. The neighboring block may include blocks A, B, C, D, E, F, G illustrated in FIG. 8 or some blocks among them. If the reference pictures of the current block and the neighboring affine block are not the same, the scaled affine candidate may be used. 2) A neighboring affine block having the same reference picture or index as that of the current (coded) block among the neighboring affine blocks may be used as the affine candidate. If the number of neighboring affine blocks having the same reference index is two or more, the neighboring affine block determined by a predefined priority may be used as the affine candidate. If the reference affine block having the same reference index does not exist, the scaled affine candidate of the neighboring affine block in a predefined order may be used. Alternatively, the scaled affine candidate of the neighboring affine block having the reference picture close to the current block may be used. the inherited affine candidate may not be considered.

Assuming that the n is 2, if the number of neighboring affine blocks is 1, one affine merge candidate may be generated. Here, if the reference picture of the current block and the reference picture of the neighboring affine block are different, the affine merge candidate may be scaled and used based on the reference picture of the current block. This may be referred to as the scaled affine merge candidate. If the number of neighboring affine blocks is two or more, the neighboring affine block may be selected to generate the affine merge candidate, and as the selection method, any one of the following methods may be used.

1) Two neighboring affine blocks first confirmed by examining the neighboring block according to a predefined order may be used for the affine merge mode. The neighboring block may include blocks A, B, C, D, E, F, G illustrated in FIG. 8 or some blocks among them. Here, if the reference pictures of the current block and the neighboring affine block are not the same, the scaled affine merge candidate may be used. 2) A neighboring affine block having the same reference picture or index as that of the current (coded) block among the neighboring affine blocks may be used as the affine candidate. If the neighboring affine block having the same reference index is three or more, the neighboring affine block determined by a predefined priority may be used as the affine candidate. If the neighboring affine block having the same reference index is less than two, the scaled affine candidate of the neighboring affine block in a predefined order may be used. Alternatively, the scaled affine candidate of the neighboring affine block having the reference picture close to the current block may be used. Alternatively, the scaled affine candidate of the neighboring affine block having the reference picture close to the reference picture of the current block may be used. Alternatively, the inherited affine candidate may not be considered.

Figure 9:
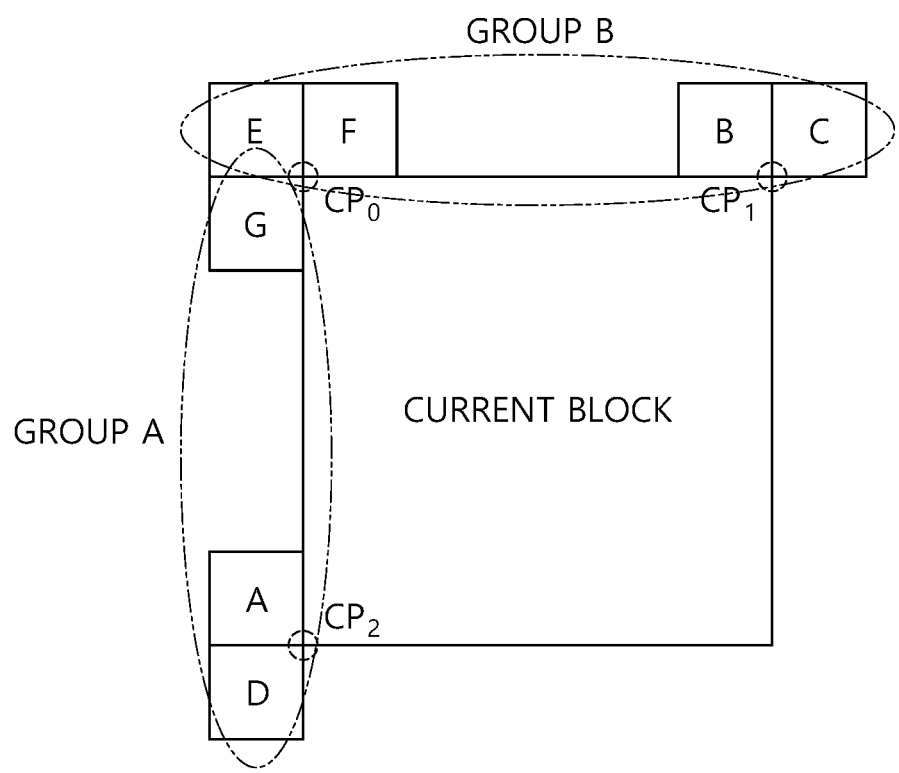
FIG. 9 exemplarily illustrates a case of using two groups in order to examine the neighboring affine block according to the exemplary embodiment of the present disclosure.

FIG. 9 exemplarily illustrates a case of using two groups to examine the neighboring affine block according to the exemplary embodiment of the present disclosure.

The exemplary embodiment of the present disclosure may propose a method for considering the inherited affine candidate as the candidate of the affine inter mode using a group. Two or three groups may be configured, a case of using two groups will be described below, and a case of using three groups will be described later with reference to FIG. 10.

Referring to FIG. 9, the block to be examined may be divided into two groups, and one candidate in each group may be determined. A position at which the neighboring affine block is examined may be blocks A, B, C, D, E, F, G illustrated in FIG. 9 or some blocks among them, and this may be referred to as the neighboring block. Two groups may include a group A and a group B. The group A may include the blocks A, D, G among the neighboring blocks or some blocks among them and the group B may include the blocks B, C, E, F among the neighboring blocks or some blocks among them.

The examination order of the group may be the group A→the group B, but is not limited thereto. The examination order of the group A may be the block A→the group D→the group G, but the examination may also be performed in various orders, and thus is not limited thereto. The examination order of the group B may be the block B→the group C→the group F→the group E, but the examination may also be performed in various orders, and thus is not limited thereto.

As a detailed method for determining the affine candidate in the group A, any one of the following method may be used, and may also be equally applied to the group B. 1) A first neighboring affine block in the examination order of the group A may be considered as the inherited candidate. Here, if the reference picture of the current block and the reference picture of the neighboring affine block are different, the scaled inherited candidate may be considered. 2) A neighboring affine block having the same reference picture as the current reference picture in the examination order of the group A may be considered as the candidate, and if the neighboring affine block does not exist, the scaled candidate may be considered. 3) A neighboring affine block having the same reference picture as the current reference picture in the examination order of the group A may be considered as the candidate, and if the neighboring affine block does not exist, the neighboring affine block may not be considered as the candidate.

Figure 10:
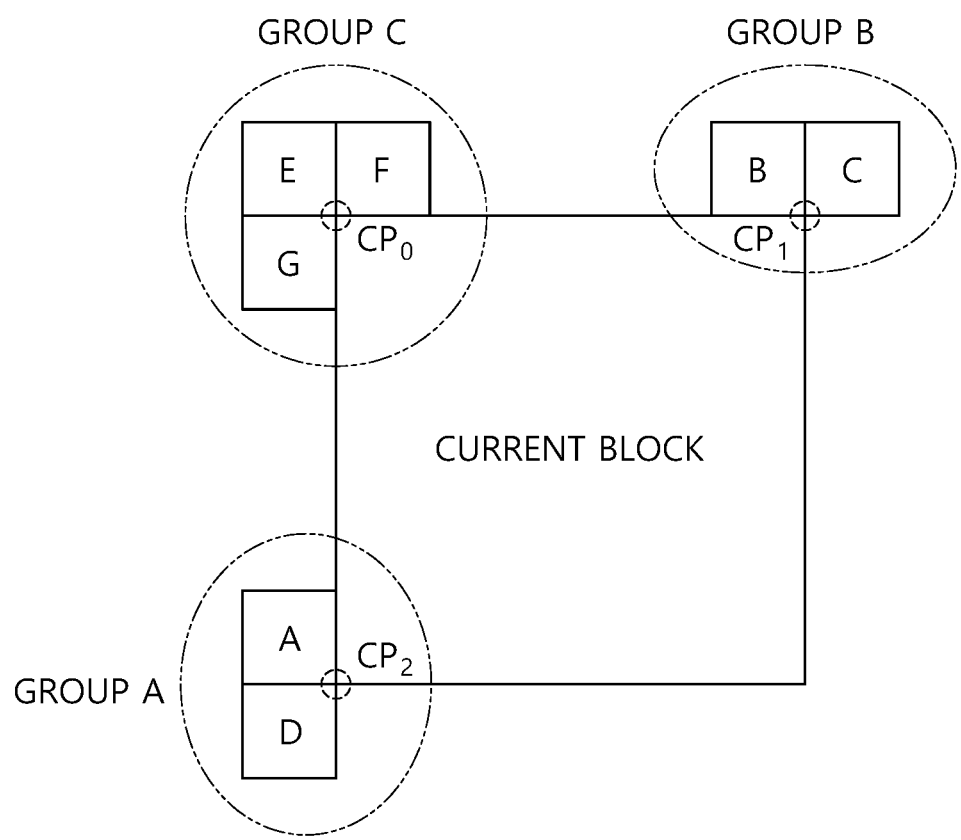
FIG. 10 exemplarily illustrates a case of using three groups in order to examine the neighboring affine block according to the exemplary embodiment of the present disclosure.

FIG. 10 exemplarily illustrates a case of using three groups to examine the neighboring affine block according to the exemplary embodiment of the present disclosure.

Referring to FIG. 10, the block to be examined may be divided into three groups, and one candidate in each group may be determined. A position at which the neighboring affine block is examined may be blocks A, B, C, D, E, F, G illustrated in FIG. 10 or some blocks among them, and this may be referred to as the neighboring block. Three groups may include a group A, a group B, and a group C. The group A may include the blocks A, D among the neighboring blocks or some blocks among them, the group B may include the blocks B, C among the neighboring blocks or some blocks among them, and the group C may include the blocks E, F, G among the neighboring blocks or some blocks among them.

The examination order of the group may be the group A→the group B→the group C, but is not limited thereto. The examination order of the group A may be the block A→the group D or the group D→the group A, the examination order of the group B may be the block B→the group C or the group C→the group B, and the examination order of the group C may be the block G→the group E→the group F, but the examination may also be performed in various orders, and thus is not limited thereto.

As a detailed method for determining the affine candidate in the group A, any one of the following method may be used, and may also be equally applied to the group B and the group C. 1) A first neighboring affine block in the examination order of the group A may be considered as the inherited candidate. Here, if the reference picture of the current block and the reference picture of the neighboring affine block are different, the scaled inherited candidate may be considered. 2) A neighboring affine block having the same reference picture as the current reference picture in the examination order of the group A may be considered as the candidate, and if the neighboring affine block does not exist, the scaled candidate may be considered. 3) A neighboring affine block having the same reference picture as the current reference picture in the examination order of the group A may be considered as the candidate, and if the neighboring affine block does not exist, the neighboring affine block may not be considered as the candidate.

Figure 11:
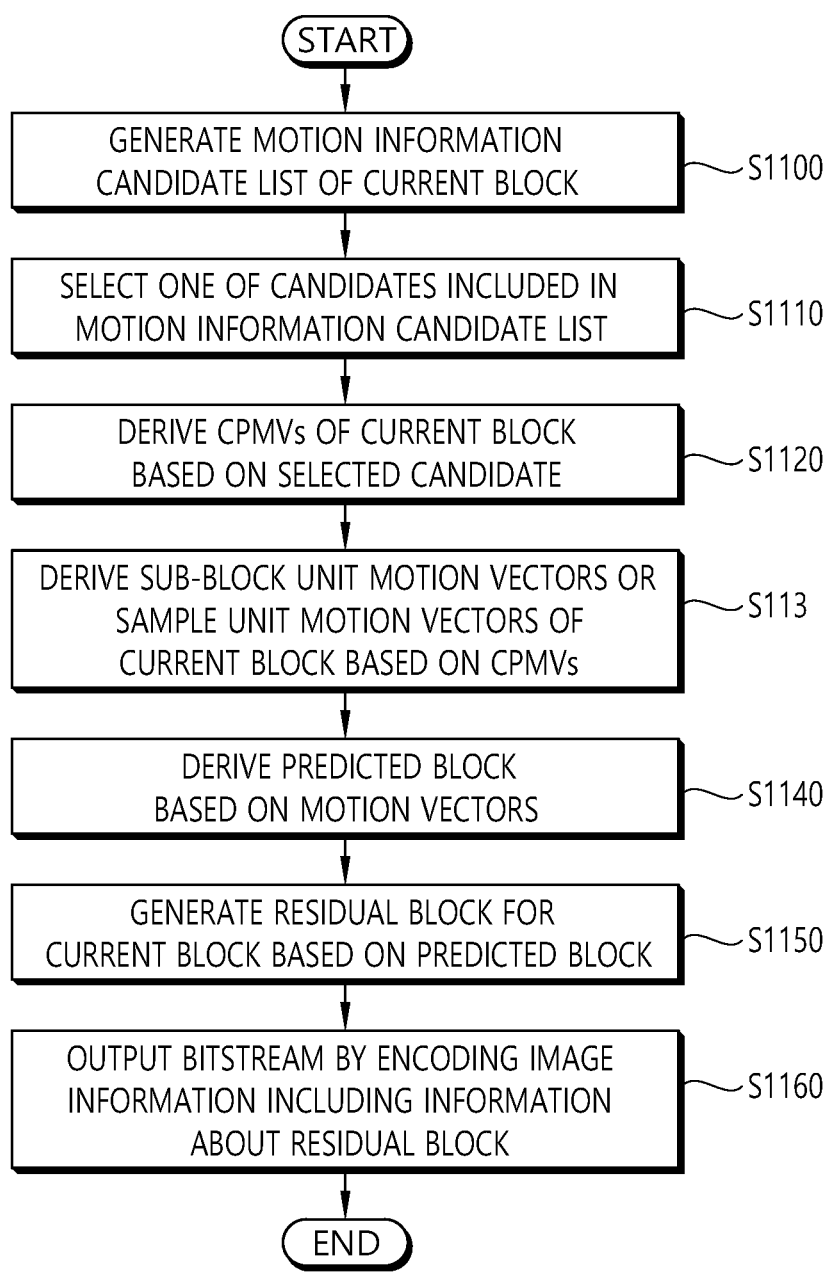
FIG. 11 schematically illustrates a video encoding method by an encoding apparatus according to the exemplary embodiment of the present disclosure.

FIG. 11 schematically illustrates a video encoding method by an encoding apparatus according to the exemplary embodiment of the present disclosure.

A method illustrated in FIG. 11 may be performed by the encoding apparatus illustrated in FIG. 1. For example, S1100 to S1140 illustrated in FIG. 11 may be performed by the predictor of the encoding apparatus, S1150 may be performed by the subtractor of the encoding apparatus, and S1160 may be performed by the entropy encoder of the encoding apparatus.

The encoding apparatus generates a motion information candidate list of a current block (S1100). Here, the motion information candidate list may include an affine candidate list. Alternatively, the motion information candidate list may include an inherited affine candidate. The inherited affine candidate may be derived based on candidate blocks coded by an affine prediction among spatial neighboring blocks of the current block.

The candidate block may be some blocks among the spatial neighboring blocks of the current block. That is, the candidate block may be included in the spatial neighboring blocks. The inherited affine candidate may be generated up to a predefined maximum number. The inherited affine candidate may be a candidate according to an affine merge mode, and may also be a candidate according to an affine inter mode, and therefore, the motion information candidate list may include a merge candidate list or an affine merge candidate list or include an MVP candidate list or an affine MVP candidate list.

For example, the inherited affine candidate may be a candidate according to the affine merge mode. If the number of candidate blocks is equal to the maximum number, the inherited affine candidate may be derived one by one for each candidate block. For example, if the number of candidate blocks coded by the affine prediction is 1, one inherited affine candidate may be derived based on the above.

However, if the number of candidate blocks is larger than the maximum number, the inherited affine candidate may be derived based on the candidate block coded by the affine prediction preferentially confirmed by examining the spatial neighboring blocks according to a predefined scan order. Here, the candidate block may be used by the maximum number, and the predefined scan order may also be referred to as a predefined order or examination order.

Alternatively, if the number of candidate blocks is larger than the maximum number, the inherited affine candidate may be derived based on a candidate block having the smallest reference index or a candidate block having a reference picture closest to a current picture. Here, the current picture may be referred to as a picture including the current block.

Alternatively, if the number of candidate blocks is larger than the maximum number, the inherited affine candidate may be derived based on a candidate block having the most frequently occurring reference index among the reference indexes of the spatial neighboring blocks or the reference indexes of the candidate blocks. Alternatively, the inherited affine candidate may be derived based on a candidate block having the largest block size. A detailed description thereof has been made with reference to FIG. 8. In FIG. 8, the maximum number may refer to n, and the case where the n is 1 and the case where the n is 2 have been described as an example, but the value of the n is not limited thereto and may be increased.

For example, the inherited affine candidate may be a candidate according to the affine inter mode. If the number of candidate blocks is equal to the maximum number, the inherited affine candidate may be derived one by one for each candidate block. For example, if the number of candidate blocks coded by the affine prediction is 1, one inherited affine candidate may be derived based on the above.

Here, if the reference picture of the current block and the reference picture of the candidate block are different, the inherited affine candidate may be derived based on the motion vectors of the candidate blocks, and the motion vector of the candidate block may be scaled based on the reference picture of the current block. Alternatively, the motion vector of the candidate block may be scaled based on a distance between the current block and the reference picture of the current block and a distance between the candidate block and the reference picture of the candidate block.

However, if the number of candidate blocks is larger than the maximum number, the inherited affine candidate may be derived based on the candidate block having the same the reference picture or the reference index as that of the current block. Alternatively, if the number of candidate blocks is larger than the maximum number and the candidate block having the same the reference picture or the reference index as that of the current block does not exist, the inherited affine candidate may be derived based on the motion vector of the candidate block in the predefined scan order, the motion vector of the candidate block having the reference picture closest to the current picture, or the motion vector of the candidate block having the reference picture closest to the reference picture of the current block, and the motion vector of the candidate block may be scaled based on the reference picture of the current block. Alternatively, the motion vector of the candidate block may be scaled based on the distance between the current block and the reference picture of the current block and the distance between the candidate block and the reference picture of the candidate block. Here, the current picture may be referred to as a picture including the current block, and the predefined scan order may also be referred to as the predefined order or examination order. A detailed description thereof has been made with reference to FIG. 8. In FIG. 8, the maximum number may refer to n, and the case where the n is 1 and the case where the n is 2 have been described as an example, but the value of the n is not limited thereto and may be increased.

For example, if the inherited affine candidate is a candidate according to the affine inter mode, the spatial neighboring blocks of the current block may be divided into groups. Alternatively, the spatial neighboring blocks of the current block may be divided into two or more groups. The inherited affine candidate may be derived based on the group. Alternatively, the inherited affine candidate may be derived one by one for each group. Alternatively, the inherited affine candidate may be derived for each group based on the candidate block within the group. Alternatively, the inherited affine candidate may select the candidate block one by one for each group, and be derived based on the selected candidate block.

For example, the groups may include a first group and a second group. The first group may include a bottom-left corner neighboring block of the current block and a left neighboring block adjacent to the top of the bottom-left corner neighboring block. Further, the first group may further include a left neighboring block adjacent to the bottom of a top-left corner neighboring block of the current block. The second group may include the top-left corner neighboring block, a top-right corner neighboring block of the current block, and a top neighboring block adjacent to the left of the top-right corner neighboring block. Further, the second group may further include a top neighboring block adjacent to the right of the top-left corner neighboring block. A detailed description thereof has been made with reference to FIG. 9. In FIG. 9, the group A may refer to the first group, and the group B may refer to the second group.

For example, the groups may include the first group, the second group, and a third group. The first group may include the bottom-left corner neighboring block of the current block and the left neighboring block adjacent to the top of the bottom-left corner neighboring block, the second group may include the top-right corner neighboring block of the current block and the top neighboring block adjacent to the left of the top-right corner neighboring block, and the third group may include the top-left corner neighboring block of the current block, the top neighboring block adjacent to the right of the top-left corner neighboring block, and the left neighboring block adjacent to the bottom of the top-left corner neighboring block. A detailed description thereof has been made with reference to FIG. 10. In FIG. 10, the group A may refer to the first group, the group B may refer to the second group, and the group C may refer to the third group.

Here, the inherited affine candidate may be derived based on the candidate block coded by the affine prediction preferentially confirmed by examining the blocks within the group according to the predefined scan order in each group. Alternatively, if the reference picture of the current block is different from the reference picture of the candidate block, the inherited affine candidate may be derived based on the motion vector of the candidate block, and the motion vector of the candidate block may be scaled based on the reference picture of the current block. Alternatively, the motion vector of the candidate block may be scaled based on the distance between the current block and the reference picture of the current block and the distance between the candidate block and the reference picture of the candidate block. Alternatively, the inherited affine candidate may be derived based on the candidate block having the reference picture which is the same as the reference picture of the current block in each group. A detailed description thereof has been made with reference to FIGS. 9 and 10. If two or three groups exist, the examination order between the groups and the examination order for each group have been described with reference to FIGS. 9 and 10, but this is for convenience for explanation and the examination order applicable to the present disclosure is not limited thereto. Further, the candidate block in the aforementioned description may be interchangeably used with the neighboring block.

The encoding apparatus selects one of the candidates included in the motion information candidate list (S1110). Here, selection information may be generated. The selection information may include information about one candidate selected from the motion information candidate list, and may also include index information about one candidate selected from the motion information candidate list.

The encoding apparatus derives control point motion vectors (CPMVs) of the current block based on the selected candidate (S1120). The control point motion vector may refer to a motion vector at the control point. Referring to FIG. 8, the control points may include a control point $CP_0$ located at a top-left sample position of the current block and a control point $CP_1$ located at a top-right sample position of the current block, and may further include a control point $CP_2$ located at a bottom-left sample position of the current block. A detailed description thereof has been described with reference to FIGS. 5A and 5B.

The encoding apparatus derives sub-block unit motion vectors or sample unit motion vectors of the current block based on the CPMVs (S1130). The encoding apparatus may derive an affine motion vector field based on the CPMVs. The affine motion vector field may derive the sub-block unit motion vectors or the sample unit motion vectors based on x components and y components of the CPMVs. Here, the sub-block unit motion vector unit may represent the motion vector at the center of the sub-block. The affine motion vector field may be derived by Equation 1 or Equation 2 according to the number of CPMVs, but is not limited thereto.

The encoding apparatus derives a predicted block based on the sub-block unit motion vectors or the sample unit motion vectors (S1140). Here, the predicted block may mean a block having the high correlation with the current block.

The encoding apparatus generates a residual block for the current block based on the predicted block (S1150). The residual block may be derived based on the predicted block and the current block. Alternatively, the residual block may be derived based on a difference between the predicted block and the current block.

The encoding apparatus outputs a bitstream by encoding image information including information about the residual block (S1160). The information about the residual block may include the residual block and information related to the residual block. Here, the image information may further include selection information, and the encoding apparatus may signal the image information further including the selection information. Alternatively, the encoding apparatus may output the bitstream by encoding the image information further including the selection information. The bitstream may be transmitted to the decoding apparatus through a network or a storage medium.

FIG. 12 schematically illustrates a video decoding method by a decoding apparatus according to the exemplary embodiment of the present disclosure.

A method illustrated in FIG. 12 may be performed by the decoding apparatus illustrated in FIG. 2. For example, S1200 to S1240 illustrated in FIG. 12 may be performed by the predictor of the decoding apparatus, and S1250 may be performed by the reconstructor of the decoding apparatus.

The decoding apparatus generates a motion information candidate list of the current block (S1200). Here, the motion information candidate list may include an affine candidate list. Alternatively, the motion information candidate list may include an inherited affine candidate. The inherited affine candidate may be derived based on candidate blocks coded by an affine prediction among spatial neighboring blocks of the current block.

The candidate block may be some blocks among the spatial neighboring blocks of the current block. That is, the candidate block may be included in the spatial neighboring blocks. The inherited affine candidate may be generated up to a predefined maximum number. The inherited affine candidate may be a candidate according to an affine merge mode, and may also be a candidate according to an affine inter mode, and therefore, the motion information candidate list may include a merge candidate list or an affine merge candidate list or include an MVP candidate list or an affine MVP candidate list.

For example, the inherited affine candidate may be the candidate according to the affine merge mode. If the number of candidate blocks is equal to the maximum number, the inherited affine candidate may be derived one by one for each candidate block. For example, if the number of candidate blocks coded by the affine prediction is 1, one inherited affine candidate may be derived based on the above.

However, if the number of candidate blocks is larger than the maximum number, the inherited affine candidate may be derived based on the candidate blocks coded by the affine prediction preferentially confirmed by examining the spatial neighboring blocks according to a predefined scan order. Here, the maximum number of candidate blocks may be used, and the predefined scan order may also be referred to as a predefined order or examination order.

Alternatively, if the number of candidate blocks is larger than the maximum number, the inherited affine candidate may be derived based on a candidate block having the smallest reference index or a candidate block having a reference block closest to the current picture. Here, the current picture may refer to a picture including the current block.

Alternatively, if the number of candidate blocks is larger than the maximum number, the inherited affine candidate may be derived based on a candidate block having the most frequently occurring reference index among reference indexes of the spatial neighboring blocks or reference indexes of the candidate blocks. Alternatively, the inherited affine candidate may be derived based on a candidate block having the largest block size. A detailed description thereof has been made with reference to FIG. 8. In FIG. 8, the maximum number may refer to n, and the case where the n is 1 and the case where the n is 2 have been described as an example, but the value of the n is not limited thereto and may be increased.

For example, the inherited affine candidate may be a candidate according to the affine inter mode. If the number of candidate blocks is equal to the maximum number, the inherited affine candidate may be derived one by one for each candidate block. For example, if the number of candidate blocks coded by the affine prediction is 1, one inherited affine candidate may be derived based on the above.

Here, if the reference picture of the current block and the reference picture of the candidate block are different, the inherited affine candidate may be derived based on the motion vectors of the candidate blocks, and the motion vector of the candidate block may be scaled based on the reference picture of the current block. Alternatively, the motion vector of the candidate block may be scaled based on a distance between the current block and the reference picture of the current block and a distance between the candidate block and the reference picture of the candidate block.

However, if the number of candidate blocks is larger than the maximum number, the inherited affine candidate may be derived based on the candidate block having the same the reference picture or the reference index as that of the current block. Alternatively, if the number of candidate blocks is larger than the maximum number and the candidate block having the same the reference picture or the reference index as that of the current block does not exist, the inherited affine candidate may be derived based on the motion vector of the candidate block in the predefined scan order, the motion vector of the candidate block having the reference picture closest to the current picture, or the motion vector of the candidate block having the reference picture closest to the reference picture of the current block, and the motion vector of the candidate block may be scaled based on the reference picture of the current block. Alternatively, the motion vector of the candidate block may be scaled based on the distance between the current block and the reference picture of the current block and the distance between the candidate block and the reference picture of the candidate block. Here, the current picture may refer to a picture including the current block, and the predefined scan order may also refer to the predefined order or examination order. A detailed description thereof has been made with reference to FIG. 8. In FIG. 8, the maximum number may refer to n, and the case where the n is 1 and the case where the n is 2 have been described as an example, but the value of the n is not limited thereto and may be increased.

For example, if the inherited affine candidate is the candidate according to the affine inter mode, the spatial neighboring blocks of the current block may be divided into groups. Alternatively, the spatial neighboring blocks of the current block may be divided into two or more groups. The inherited affine candidate may be derived based on the group. Alternatively, the inherited affine candidate may be derived one by one for each group. Alternatively, the inherited affine candidate may be derived for each group based on the candidate block within the group. Alternatively, the inherited affine candidate may select the candidate block one by one for each group, and be derived based on the selected candidate block.

For example, the groups may include a first group and a second group. The first group may include a bottom-left corner neighboring block of the current block and a left neighboring block adjacent to the top of the bottom-left corner neighboring block. Further, the first group may further include a left neighboring block adjacent to the bottom of a top-left corner neighboring block of the current block. The second group may include the top-left corner neighboring block, a top-right corner neighboring block of the current block, and a top neighboring block adjacent to the left of the top-right corner neighboring block. Further, the second group may further include a top neighboring block adjacent to the right of the top-left corner neighboring block. A detailed description thereof has been made with reference to FIG. 9. In FIG. 9, the group A may refer to the first group, and the group B may refer to the second group.

For example, the groups may include the first group, the second group, and a third group. The first group may include the bottom-left corner neighboring block of the current block and the left neighboring block adjacent to the top of the bottom-left corner neighboring block, the second group may include the top-right corner neighboring block of the current block and the top neighboring block adjacent to the left of the top-right corner neighboring block, and the third group may include the top-left corner neighboring block of the current block, the top neighboring block adjacent to the right of the top-left corner neighboring block, and the left neighboring block adjacent to the bottom of the top-left corner neighboring block. A detailed description thereof has been made with reference to FIG. 10. In FIG. 10, the group A may refer to the first group, the group B may refer to the second group, and the group C may refer to the third group.

Here, the inherited affine candidate may be derived based on the candidate block coded by the affine prediction preferentially confirmed by examining the blocks within the group according to the predefined scan order in each group. Alternatively, if the reference picture of the current block is different from the reference picture of the candidate block, the inherited affine candidate may be derived based on the motion vector of the candidate block, and the motion vector of the candidate block may be scaled based on the reference picture of the current block. Alternatively, the motion vector of the candidate block may be scaled based on the distance between the current block and the reference picture of the current block and the distance between the candidate block and the reference picture of the candidate block. Alternatively, the inherited affine candidate may be derived based on the candidate block having the reference picture which is the same as the reference picture of the current block in each group. A detailed description thereof has been made with reference to FIGS. 9 and 10. If two or three groups exist, the examination order between the groups and the examination order for each group have been described with reference to FIGS. 9 and 10, but this is for convenience for explanation and the examination order applicable to the present disclosure is not limited thereto. Further, the candidate block in the aforementioned description may be interchangeably used with the neighboring block.

The decoding apparatus selects one of the candidates included in the motion information candidate list (S1210). Here, selection information may be used. The selection information may include information about one candidate selected from the motion information candidate list, and may also include index information about one candidate selected from the motion information candidate list. The selection information may be included in image information, and the image information including the selection information may be signaled to the decoding apparatus. The decoding apparatus may acquire the selection information by parsing a bitstream for the image information. The bitstream may be transmitted from the encoding apparatus through a network or a storage medium.

The decoding apparatus derives control point motion vectors (CPMVs) of the current block based on the selected candidate (S1220). The control point motion vector may be referred to as the motion vector at a control point. Referring to FIG. 8, the control points may include a control point ($CP_0$) located at a top-left sample position of the current block and a control point ($CP_1$) located at a top-right sample position of the current block, and may further include a control point ($CP_2$) located at a bottom-left sample position of the current block. A detailed description thereof has been made with reference to FIGS. 5A and 5B.

The decoding apparatus derives sub-block unit motion vectors or sample unit motion vectors of the current block based on the CPMVs (S1230). The decoding apparatus may derive an affine motion vector field based on the CPMVs. The affine motion vector field may derive the sub-block unit motion vectors or the sample unit motion vectors based on x components and y components of the CPMVs. Here, the sub-block unit motion vector may represent the motion vector at the center of the sub-block. The affine motion vector field may be derived by Equation 1 or Equation 2 according to the number of CPMVs, but is not limited thereto.

The decoding apparatus derives a predicted block based on the sub-block unit motion vectors or the sample unit motion vectors (S1240). Here, the predicted block may mean a block having the high correlation with the current block.

The decoding apparatus reconstructs the current picture based on the predicted block (S1250). Here, information about a residual block may be used. The information about the residual block may include the residual block and the information about the residual block. The residual block may be a block derived based on the predicted block and the current block. Alternatively, the residual block may be a block derived based on a difference between the predicted block and the current block. The decoding apparatus may reconstruct the current picture based on the predicted block and the information about the residual block. The information about the residual block may be included in the image information, and the image information including the information about the residual block may be signaled to the decoding apparatus. The decoding apparatus may acquire the information about the residual block by parsing the bitstream for the image information. The bitstream may be transmitted from the encoding apparatus through a network or a storage medium.

In the aforementioned exemplary embodiments, the methods are explained based on flowcharts by means of a series of steps or blocks, but the present disclosure is not limited to the order of steps, and a certain step may occur in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The aforementioned methods according to the present disclosure may be implemented as a software form, and the encoding apparatus and/or decoding apparatus according to the present disclosure may be included in an apparatus for image processing, such as, a TV, a computer, a smartphone, a set-top box, a display device or the like.

When the exemplary embodiments in the present disclosure are embodied by software, the aforementioned methods may be embodied as modules (processes, functions or the like) to perform the aforementioned functions. The modules may be stored in a memory and may be executed by a processor. The memory may be inside or outside the processor and may be connected to the processor via a well-known various means. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device.

What is claimed is:

1. A decoding apparatus for image decoding, the decoding apparatus comprising:
   a memory; and
   at least one processor connected to the memory, the at least one processor configured to:
   obtain image information including motion vector difference (MVD) information from a bitstream;
   derive affine motion vector predictor (MVP) candidate list of a current block based on neighboring blocks of the current block;
   derive control point motion vector predictors (CPMVPs) of the current block based on the affine MVP candidate list of the current block;
   derive control point motion vector differences (CPMVDs) of the current block based on the MVD information;
   derive control point motion vectors (CPMVs) of the current block based on the CPMVPs and the CPMVDs; and
   generate prediction samples for the current block based on the CPMVs of the current block,
   wherein the affine MVP candidate list comprises inherited affine candidates,
   wherein the inherited affine candidates are derived based on candidate blocks coded by an affine prediction among spatial neighboring blocks of the current block,
   wherein the inherited affine candidates comprises a first inherited affine candidate and a second inherited affine candidate,
   wherein the first inherited affine candidate is derived from a first block group comprising a bottom-left corner neighboring block and a left neighboring block of the current block, and
   wherein the second inherited affine candidate is derived from a second block group comprising a top-right corner neighboring block, a top neighboring block of the current block, and a top-left corner neighboring block.

2. An encoding apparatus for image encoding, the encoding apparatus comprising:
   a memory: and
   at least one processor connected to the memory, the at least one processor configured to:
   derive affine motion vector predictor (MVP) candidate list of a current block based on neighboring blocks of the current block;
   derive control point motion vector predictors (CPMVPs) of the current block based on the affine MVP candidate list of the current block;
   derive control point motion vectors (CPMVs) of the current block;
   derive control point motion vector differences (CPMVDs) of the current block based on the CPMVs and the CPMVPs;
   derive prediction samples for the current block based on the CPMVs;
   generate residual samples for the current block based on the prediction samples for the current block; and
   encode image information including information on the residual samples and motion vector difference (MVD) information related to the CPMVDs,
   wherein the affine MVP candidate list comprises inherited affine candidates, wherein the inherited affine candidates are derived based on candidate blocks coded by an affine prediction among spatial neighboring blocks of the current block, wherein the inherited affine candidates comprises a first inherited affine candidate and a second inherited affine candidate, wherein the first inherited affine candidate is derived from a first block group comprising a bottom-left corner neighboring block and a left neighboring block of the current block, and wherein the second inherited affine candidate is derived from a second block group comprising , a top-right corner neighboring block, a top neighboring block of the current block, and a top-left corner neighboring block.

3. An apparatus for transmitting data for an image, the apparatus comprising:

at least one processor configured to obtain a bitstream for the image, wherein the bitstream is generated based on deriving affine motion vector predictor (MVP) candidate list of a current block based on neighboring blocks of the current block, deriving control point motion vector predictors (CPMVPs) of the current block based on the affine MVP candidate list of the current block, deriving control point motion vectors (CPMVs) of the current block, deriving control point motion vector differences (CPMVDs) of the current block based on the CPMVs and the CPMVPs, deriving prediction samples for the current block based on the CPMVs, generating residual samples for the current block based on the prediction samples for the current block, and encoding image information including information on the residual samples and motion vector difference (MVD) information related to the CPMVDs; and a transmitter configured to transmit the data comprising the bitstream, wherein the affine MVP candidate list comprises inherited affine candidates, wherein the inherited affine candidates are derived based on candidate blocks coded by an affine prediction among spatial neighboring blocks of the current block, wherein the inherited affine candidates comprises a first inherited affine candidate and a second inherited affine candidate, wherein the first inherited affine candidate is derived from a first block group comprising a bottom-left corner neighboring block and a left neighboring block of the current block, and wherein the second inherited affine candidate is derived from a second block group comprising, a top-right corner neighboring block, a top neighboring block of the current block, and a top-left corner neighboring block.

* * * * *